United States Patent [19]

Imakoshi et al.

[11] Patent Number: 4,695,908
[45] Date of Patent: Sep. 22, 1987

[54] THIN FILM TYPE MAGNETIC TRANSDUCER HEAD

[75] Inventors: Shigeyoshi Imakoshi; Yutaka Soda; Hideo Suyama, all of Kanagawa, Japan

[73] Assignee: Sony Corporation, Tokyo, Japan

[21] Appl. No.: 643,542

[22] Filed: Aug. 23, 1984

[30] Foreign Application Priority Data

Aug. 29, 1983 [JP] Japan ................................ 58-157647

[51] Int. Cl.⁴ ................................................ G11B 5/23
[52] U.S. Cl. .................................... 360/119; 360/126
[58] Field of Search ......... 360/119, 120, 122, 125–127

[56] References Cited

U.S. PATENT DOCUMENTS 4,423,451 12/1983 Chi ........................................ 360/125
4,490,760 12/1984 Kaminaka ............................ 360/126

Primary Examiner—A. J. Heinz
Attorney, Agent, or Firm—Hill, Van Santen, Steadman & Simpson

[57] ABSTRACT

A thin film type magnetic transducer head comprises a magnetic substrate, and a thin film magnetic core formed on the substrate through an effective magnetic gap at one end of the substrate to be faced to a magnetic recording medium, the magnetic substrate and the thin film magnetic core forming a magnetic circuit to reproduce signals on the magnetic medium, wherein a length between a center of the magnetic gap and an edge of the magnetic core and wave length satisfy definite relations, thereby the S/N ratio and the output are improved in the digital magnetic recording.

3 Claims, 7 Drawing Figures

THIN FILM TYPE MAGNETIC TRANSDUCER HEAD

BACKGROUND OF THE INVENTION

1. Field of the Invention

The present invention relates to thin film type magnetic transducer heads in electromagnetic induction type or magnetoresistance effect type, and more particularly to a thin film type magnetic transducer head used in reproduction of a digital magnetic recording.

2. Description of the Prior Art

Referring to FIG. 1, a thin film type magnetic transducer head, for example, that of electromagnetic induction type, comprises a magnetic substrate 1 of Mn-Zn ferrite, a conductive layer 3 as a head winding formed on the magnetic substrate 1 through an insulation layer 2 of $SiO_2$ or $Si_3N_4$, and a magnetic core 5 of permalloy or sendust formed on the conductive layer 3 also through an insulation layer 4 of $SiO_2$ or $Si_3N_4$ so as to cross the conductive layer 3. Front end of the magnetic core 5 extends to an opposite surface 6 to be faced to a travelling magnetic recording medium, and a gap spacer layer 7 of $SiO_2$ having a prescribed thickness is interposed between the front end of the core 5 and the magnetic substrate 1 and further an effective magnetic gap g with gap length specified by the thickness of the gap spacer layer 7 is faced to the opposite surface 6 to the travelling magnetic recording medium. Rear end of the magnetic core 5 is attached to the magnetic substrate 1 directly, for example, and magnetically connected to the substrate 1 in close connection. Thus the magnetic circuit of the substrate 1 - the magnetic gap g - the magnetic core 5 - the substrate 1 is formed around the conductive layer 3, and signal magnetic flux from the travelling magnetic recording medium faced to the opposite surface 6 is supplied to the magnetic circuit through the effective magnetic gap g, thereby induction current is produced in the conductive layer 3 being head winding so as to take the reproduction signal.

Referring to FIG. 2, the thin film type magnetic transducer head has the effective magnetic gap g as shown schematically. Since the core length at one core front side opposed through the gap g of the magnetic circuit is specified by the thickness of the magnetic core 5, the core length is as short as 0.1–10 μm and the frequency characteristics are affected by the shape effect. Although the intrinsic frequency characteristic curve decreases simply as shown in broken line of FIG. 3 on account of spacing loss, a real characteristic curve has weaving as shown in solid line of FIG. 3. FIG. 4 shows deviation of the weaving, where frequencies at apexes of the first dip, the second peak, the second dip, . . . are designated by $f_1, f_2, f_3, \ldots$ respectively, intersections of the weaving at both sides of the dips and the peaks with the convergence level axis (deviation 0) are taken as $f_o$, $f_a, f_b, f_c$, and wave lengths corresponding to these frequencies are taken as $\lambda_1, \lambda_2, \lambda_3; \lambda_{opl}, \lambda_a, \lambda_b, \lambda_c$. Each wave length is a value of the relative velocity v of the travelling magnetic recording medium to the magnetic transducer head divided by each frequency.

Since the weaving in the frequency characteristics is phenomenon caused by that the core length is short in the thin film type magnetic transducer head, this phenomenon occurs irrespective of the detecting mode in the thin film type magnetic head, either electromagnetic induction type or magnetoresistance effect type.

SUMMARY OF THE INVENTION

It is an object of the present invention to provide a thin film type magnetic transducer head.

It is another object of the present invention to provide a thin film type magnetic transducer head having an improved signal to noise ratio.

It is further object of the present invention to provide a thin film type magnetic transducer head having an improved frequency response.

In order to attain the above objects, a thin film type magnetic transducer head according to the invention comprises a magnetic substrate, and a thin film magnetic core formed on the substrate through an effective magnetic gap at one end of the substrate to be faced to a travelling magnetic recording medium, the magnetic substrate and the thin film magnetic core forming a magnetic circuit to reproduce signals on the travelling magnetic medium, wherein a length b between a center of the effective magnetic gap and an edge of the magnetic core and a wave legth $\lambda_m = v/f_m$ (v: relative volocity, $f_m$: maximum frequency) satisfy definite relations.

DESCRIPTION OF THE PREFERRED EMBODIMENTS

In digital magnetic recording, frequency characteristics shall satisfy following two requirements mainly as electromagnetic converting characteristics for the magnetic recording medium and the magnetic head.

(i) Sufficient S/N ratio is obtained at frequency $f_m$.
(ii) Gradient of frequency characteristics is gentle at frequency $f_m$.

Wherein $f_m$ means a frequency representing the frequency band in which the highest S/N ratio is required in the digital magnetic recording.

The frequency $f_m$ is specified as follows:
(a) In modulation system of NRZ, NRZI, that is, modulation system where both window margin and minimum transition length become equal to 1 channel bit length or in modulation system of MFM, FM, $f_m$ is maximum frequency $f_{max}$ ($f_m = f_{max}$).
(b) In modulation system of high density ratio, such as HDM, EFM, FEM, 3PM, $$f_m = \frac{\text{transmission rate (bit number/sec)}}{2}$$

If above requirement (ii) is satisfied, eye aperture ratio of eye pattern of output after applying an equalizer may be enlarged. This is favorable in the signal processing.

In the present invention, relation between core length by a magnetic core in a thin film type magnetic transducer head, i.e. distance b from the center of effective magnetic gap to an edge of the magnetic core in thickness direction and weaving of frequency characteristics is noticed, and electromagnetic converting efficiency, i.e. output is improved by specifying the distance b.

Figure 3:
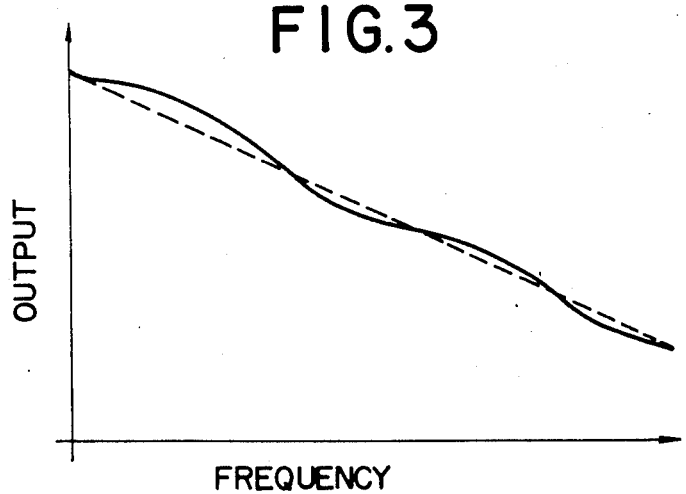
FIG. 3 is a graph of frequency characteristic curve of the magnetic transducer head.
Figure 4:
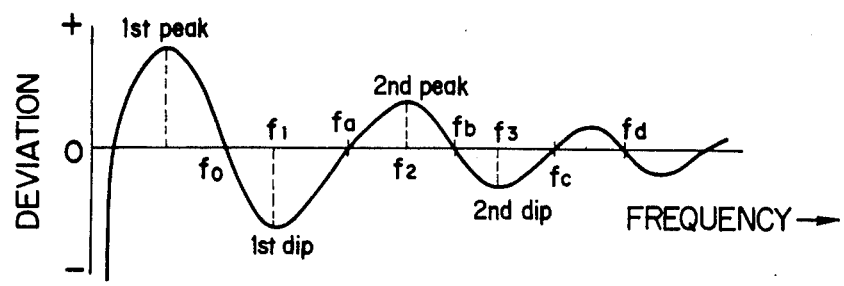
FIG. 4 is a graph showing weaving component of FIG. 3.

From frequency characteristics of FIG. 3 and FIG. 4, in order to improve output regarding above requirement (i), the invention selects relation of $$f_m < f_o \tag{1}$$

hence $$\lambda_m > \lambda_o \tag{1'}$$

$$(\lambda_m = v/f_m),$$

or otherwise relation of $$f_a < f_m < f_b \tag{2}$$

hence $$\lambda_a > \lambda_m > \lambda_b \tag{2'}$$

Regarding peak of higher harmonics over the third peak, since amplitude of the weaving attenuates to small value in higher harmonics, effect of improving the output is small. Moreover, since distance between the peak and the dip in the weaving becomes small in higher harmonics, the band width to contribute to the output improvement becomes small and utilization of the weaving is not advantageous. Consequently, region to the second peak has been studied.

Regarding above requirement (ii), since utilization in the positive gradient (derivative) of deviation of the weaving, i.e. tendency of the output increasing, is favorable, relation of $$f_1 < f_m < f_2 \tag{3}$$

hence $$\lambda_1 > \lambda_m > \lambda_2 \tag{3'}$$

is specified. Also in this case, peak at higher harmonics is not advantageous on account of above-mentioned reason.

Figure 1:
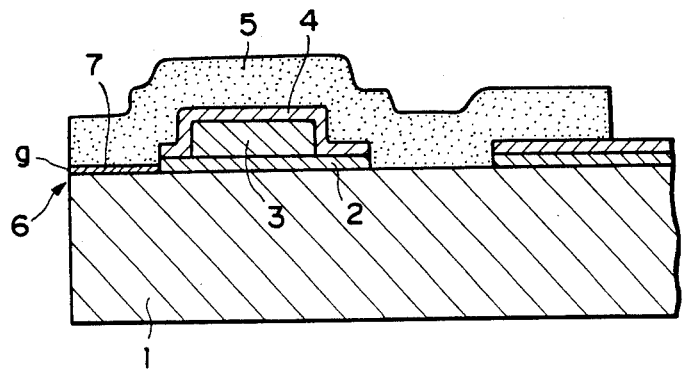
FIG. 1 is a schmatic enlarged sectional view of an example of a thin film type magnetic transducer head illustrating the invention.
Figure 2:
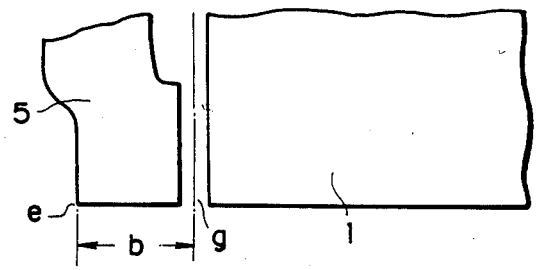
FIG. 2 is a diagram illustrating main part of the thin film type magnetic transducer head.
Figure 5:
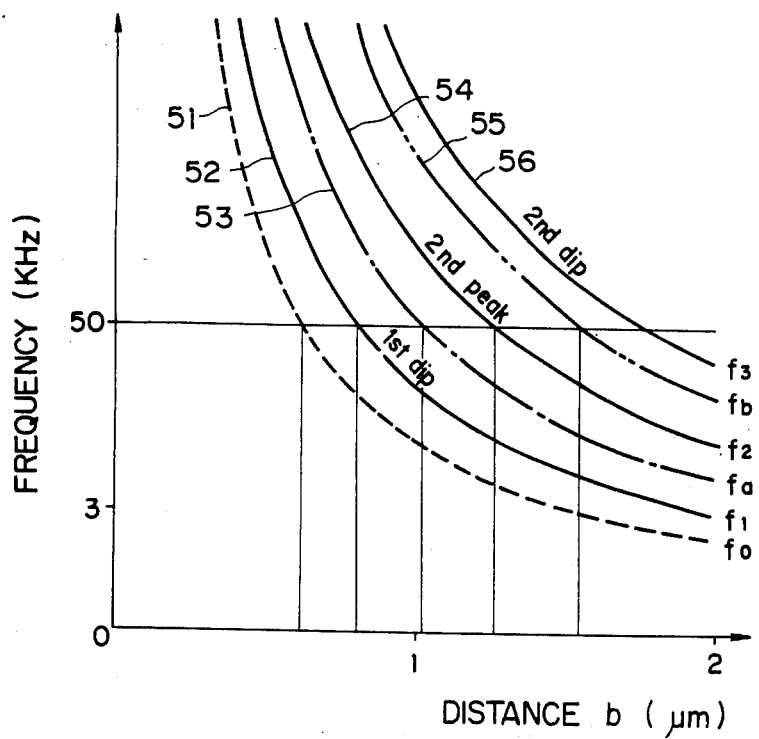
FIG. 5 is a graph showing relations of frequency in the frequency characteristic curve with respect to distance between center of an effective magnetic gap and an edge of a magnetic core.

Referring to FIG. 2, if distance from the center of effective magnetic gap g to outside edge e of a magnetic core 5 in thickness direction at the front end surface thereof is designated by b, relation of the weaving at various positions (frequencies) $f_o$, $f_1$, $f_a$, $f_2$, $f_b$, $f_3$ in FIG. 4 to the distance b is as shown in curves 51 through 56 of FIG. 5. Also relation of various wave lengths $\lambda_o$, $\lambda_1$, $\lambda_a$, $\lambda_2$, $\lambda_b$, $\lambda_3$ to the distance b is shown in lines 61 through 66 of FIG. 6. In this case, relative velocity of the magnetic recording medium to the magnetic transducer head is made v=4.8 cm/sec. Wherein the output is determined by estimating the impulse response of the head by means of conformal mapping and transforming the result in Fourier transformation.

Figure 6:
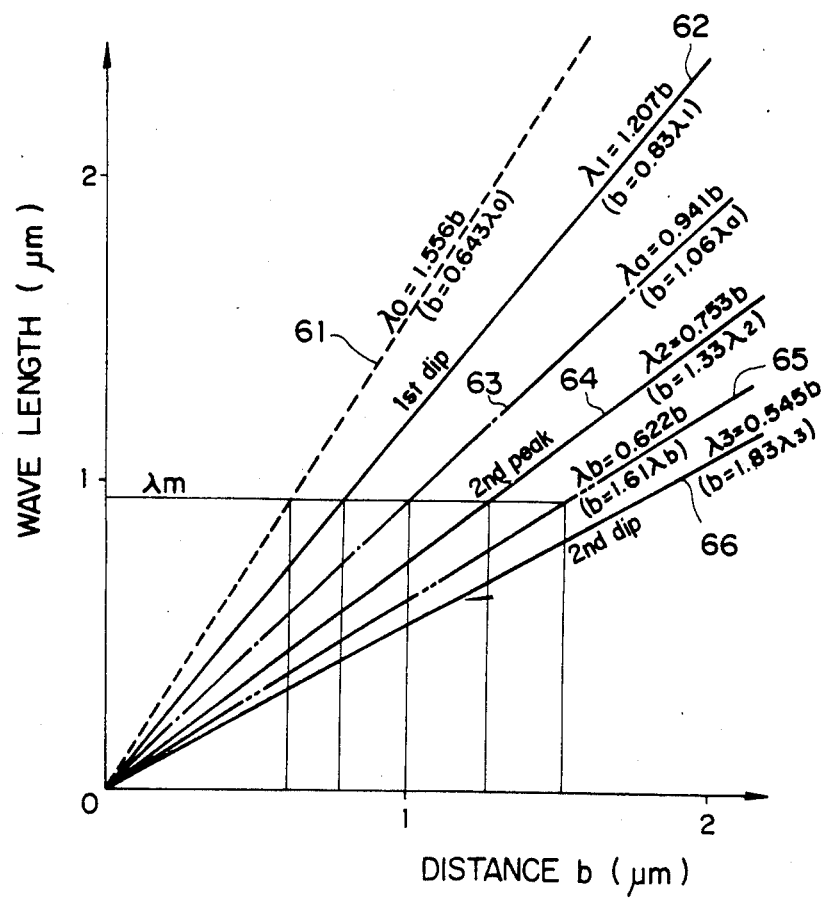
FIG. 6 is a graph showing relations of wave length in the frequency characteristic curve with respect to the distance between center of the effective magnetic gap and the edge of the magnetic core.

In the invention, such relation of frequency and wave length of the weaving to the distance b shown in FIG. 5 and FIG. 6 is noticed, and formulas (1) and (1'); (2) and (2'); and (3) and (3') are set by specifying the distance b.

In a first embodiment of the invention, in order to satisfy the above formulas (1), (1'); (2), (2'); or (3), (3'), thickness of the magnetic core to constitute the magnetic circuit, i.e. distance b from the center of the effective magnetic gap to outside edge of the magnetic core at front end surface, is selected. In a thin film type magnetic transducer head of the embodiment, a magnetic core is attached to a magnetic substrate through a non-magnetic gap spacer to form an effective magnetic gap at one end of the substrate to be faced to a magnetic recording medium, thereby the magnetic circuit passing through the magnetic core and the magnetic substrate is formed. If the relative velocity of the magnetic recording, medium to the magnetic transducer head is designated by v as above described and the maximum frequency of the digital recording or frequency of half of transmission rate is designated by $f_m$, relation between the wave length $\lambda_m = v/f_m$ and the distance b from the center of the magnetic gap to edge of the magnetic core in thickness direction is represented by $$b < 0.64 \lambda_m \tag{21}$$

or $$0.83 \lambda_m < b < 1.61 \lambda_m \tag{22}$$

Then, as clearly seen in FIG. 6, formulas (1), (1'); (2), (2'); or (3), (3') are satisfied. Consequently, the head having the above-mentioned distance b satisfying the conditions is excellent in S/N ratio and/or frequency characteristics by utilizing the weaving of the reproduction output.

Particularly, in order to improve the frequency characteristics of the reproduction output, thickness of the magnetic layer to constitute the magnetic circuit, i.e. the distance b from the center of the effective magnetic gap to outside edge of the magnetic core at front end surface, is selected. In a thin film type magnetic transducer head of this embodiment, a magnetic core is attached to a magnetic substrate through a non-magnetic gas spacer to form an effective magnetic gap at one end of the substrate to be faced to a magnetic recording medium, thereby the magnetic circuit passing through the magnetic core and the magnetic substrate is formed. If the relative velocity of the magnetic recording medium to the magnetic transducer head is designated by v and the maximum frequency of the digital recording or frequency of half of transmission rate is designated by $f_m$, relation between the wave length $\lambda_m = v/f_m$ and the distance b from the center of the magnetic gap to edge of the magnetic core in thickness direction is represented by $$0.83 \lambda_m < b < 1.33 \lambda_m \tag{23}$$

Then, as clearly seen from FIG. 6, formulas (3), (3') are satisfied. Consequently, in such constitution, portion having the positive derivative can be utilized in the weaving of frequency characteristics substantially.

Particularly, if the head being excellent in S/N ratio is required, thickness of the magnetic core to constitute the magnetic circuit, i.e. distance b from the center of the effective magnetic gap to outside edge of the magnetic core at front end surface, is selected so that formulas (1), (1') and (2), (2') are satisfied. That is, in a thin film type magnetic transducer head of this embodiment, a magnetic core is attached to a magnetic substrate through a non-magnetic gap spacer to form an effective magnetic gap at one end of the substrate to be faced to a magnetic recording medium, thereby the magnetic circuit passing through the magnetic core and the magnetic substrate is formed. If the relative velocity of the magnetic recording medium to the magnetic transducer head is designated by v and the maximum frequency of the digital recording or frequency of half of transmission rate is designated by $f_m$, relation between the wave length $\lambda_m = v/f_m$ and the distance b from the center of the magnetic gap to edge of the magnetic core in thickness direction is represented by $$b < 0.64\lambda_m \quad (24)$$

or $$1.06\lambda_m < b < 1.61\lambda_m \quad (25)$$

Then, as clearly seen from FIG. 6, formulas (1)(1')(2)(2') are satisfied. Consequently, in such constitution, portion excellent in S/N ratio can be utilized in the weaving of frequency characteristics substantially.

For example, if $f_m = 50$ kHz and relative velocity to the magnetic medium is $v = 4.76$ cm/sec, the wave length becomes $\lambda_m 0.952$ μm. In FIGS. 5 and 6, if intersections of curves are determined at the frequency $f_m = 50$ kHz and the wave length $\lambda_m = 0.952$ μm, relations become $$b < 0.61 \text{ μm}$$

or $$0.79 \text{ μm} < b < 1.53 \text{ μm}$$

These correspond to relations (21) and (22). If the distance b is specified as above, S/N ratio in the requirement (i) is improved and also frequency characteristics in the requirement (ii) done. Also relation becomes $$0.79 \text{ μm} < b < 1.26 \text{ μm}$$

This corresponds to relation (23). If the distance b is specified as above, gentle frequency characteristics are obtained in the frequency $f_m$.

Furthermore, if the distance b is represented by $$1.01 \text{ μm} < b < 1.53 \text{ μm}$$

or $$b < 0.61 \text{ μm}$$

the S/N ratio of the magnetic transducer head is improved.

Figure 7:
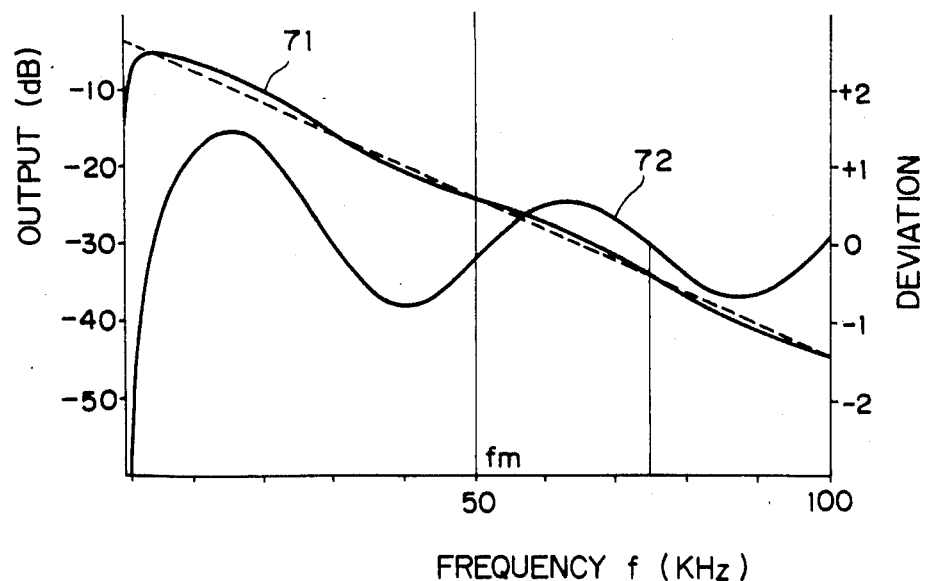
FIG. 7 is a graph of frequency characteristic curve illustrating an example of a magnetic transducer head according to the invention.

In FIG. 7, numeral 71 designates the frequency characteristic curve when b = 1.0 μm, and curve 72 shows deviation of the weaving component in the curve 71, and relation becomes $f_m = f_a$ at $f_m = 50$ kHz.

In the present invention as above described, weaving effect of frequency characteristics in the thin film type magnetic head is effectively utilized, and the S/N ratio and the output are improved at the reproduction head in the digital magnetic recording.

What is claimed is:

1. A thin film type magnetic transducer head comprising a magnetic substrate, and a thin film magnetic core forced on said substrate through an effective magnetic gap at one end of said substrate arranged to face a travelling magnetic recording medium, said magnetic substrate and said thin film magnetic core forming a magnetic circuit to reproduce signals on said travelling magnetic medium, wherein a length b and a wave length $\lambda m = v/f_m$ satisfy the following relations $$b < 0.64\lambda m, \text{ or } 0.83\lambda m < b < 1.61\lambda m$$

wherein b is the thickness of said thin film magnetic core facing said travelling magnetic recording medium plus one-half the gap length of said effective magnetic gap, v is the relative velocity of said travelling magnetic recording medium to said magnetic transducer head, and $f_m$ is maximum frequency or half of transmission rate.

2. A thin film type magnetic transducer head comprising a magnetic substrate, and a thin film magnetic core formed on said substrate through an effective magnetic gap at one end of said substrate arranged to face a travelling magnetic recording medium, said magnetic substrate and said thin film magnetic core forming a magnetic circuit to reproduce signals on said travelling magnetic medium, wherein a length b and a wave length $\lambda m = v/f_m$ satisfy the following relations $$0.83\lambda m < b < 1.33\lambda m$$

wherein b is the thickness of said thin film magnetic core facing said travelling magnetic recording medium plus one-half the gap length of said effective magnetic gap, v is the relative velocity of said travelling magnetic recording medium to said magnetic transducer head, and $f_m$ is maximum frequency or half the transmission rate.

3. A thin film type magnetic transducer head comprising a magnetic substrate, and a thin film magnetic core formed on said substrate through an effective magnetic gap at one end of said substrate arranged to face a travelling magnetic recording medium, said magnetic substrate and said thin film magnetic core forming a magnetic circuit to reproduce signals on said travelling magnetic medium, wherein a length b and a wave length $\lambda m = v/f_m$ satisfy the following relations $$b < 0.64\lambda m, \text{ or } 1.06\lambda m < b < 1.61\lambda m$$

wherein b is thickness of said thin film magnetic core facing said travelling magnetic recording medium plus one-half the gap length of said effective magnetic gap, v is relative velocity of said travelling magnetic recording medium to said magnetic transducer head, $f_m$ is maximum frequency or half the transmission rate.

* * * * *